(12) United States Patent
Gimpel et al.

(10) Patent No.: US 6,554,904 B1
(45) Date of Patent: Apr. 29, 2003

(54) ROLLER ARRANGEMENT FOR A PRODUCT TO BE COATED IN A MOLTEN METAL BATH

(76) Inventors: Matthias Gimpel, Pontdriesch 8 a, Aachen (DE), D-52062; Eckhard Siegmann, Templegraben 6, Aachen (DE), D-52062

( * ) Notice: Subject to any disclaimer, the term of this patent is extended or adjusted under 35 U.S.C. 154(b) by 0 days.

(21) Appl. No.: 09/714,502

(22) Filed: Nov. 17, 2000

Related U.S. Application Data

(63) Continuation of application No. PCT/EP99/03502, filed on May 21, 1999.

(30) Foreign Application Priority Data

May 28, 1998 (DE) .......................................... 198 23 854

(51) Int. Cl.[7] .................................................. B05C 3/00
(52) U.S. Cl. ........................................ 118/423; 118/419
(58) Field of Search .............................. 384/478, 134, 384/130, 565, 572, 907.1; 118/423, 419; 492/27

(56) References Cited

U.S. PATENT DOCUMENTS

| 5,568,985 A | 10/1996 | Schuttle ...................... 384/478 |
| 5,571,328 A | 11/1996 | Newland ..................... 118/423 |
| 5,718,519 A | * 2/1998 | Ookouchi et al. |
| 5,954,880 A | * 9/1999 | Aoki et al. |

FOREIGN PATENT DOCUMENTS

| DE | 832574 | 2/1952 |
| DE | 3404088 | 8/1985 |
| DE | 3940890 | 6/1991 |
| DE | 4307282 A1 | 9/1993 |
| EP | 0422799 | 4/1991 |
| EP | 0524851 | 1/1993 |

OTHER PUBLICATIONS

"Wälzlagler Aus Keramik Im . . . " Cerobear, Antriebstechnik 34 (1995) No. 7.
German Patent Application No. 198 23 854.1–22 of Gimpel U.A. (Dec. 9, 1999).
198 23 854.1–22, Gimpel, Unexamined Patent Appl. "Walzlager Aus Keramik . . . ", 34, 1995.

* cited by examiner

Primary Examiner—Brenda A. Lamb
(74) Attorney, Agent, or Firm—Liniak, Rerenato & White, LLC

(57) ABSTRACT

The invention concerns a roller arrangement for a product to be coated in a molten metal bath, having a roller (1) which rotates in the metal bath and is retained at the ends rotatably on support arms (2) by way of rolling bearings (4), the rolling bearings (4) each being arranged in a bearing housing (5) sealed with respect to the metal bath (M), which is characterized in that in order to seal the bearing housing (5) with respect to the roller (1), sealing surfaces (15, 16) extending transversely to the roller axis (X) are configured [on a radially projecting shoulder (14) of the roller (1)] and on the bearing housing (5), and are retained under pressure against one another or against an interposed seal element (20).

23 Claims, 8 Drawing Sheets

ROLLER ARRANGEMENT FOR A PRODUCT TO BE COATED IN A MOLTEN METAL BATH

CROSS-REFERENCE TO RELATED APPLICATIONS

This application is a continuation of pending PCT application No. PCT/EP99/03502, filed May 21, 1999, the disclosure of which is incorporated herein by reference. A claim to priority under 35 U.S.C. §120 is hereby made to PCT/EP99/03502.

The present invention concerns a roller arrangement for a product to be coated in a molten metal bath, having a roller which rotates in the metal bath and is retained at the ends rotatably on support arms by way of rolling bearings, the rolling bearings being arranged in bearing housings sealed with respect to the metal bath.

In hot galvanizing, tinning, or aluminizing, one or more rollers, bearing-mounted at both ends, are immersed into a metal bath in order to guide therein the strip that is to be coated. Plain bearings have hitherto predominantly been used to support the rollers in the metal bath. These bearings, completely immersed in the metal bath, have the disadvantage of short service lives, since high temperatures, friction, and attack by the liquid metal cause severe wear on the bearing surfaces. The wear results in rough running or even brief seizing of the roller. The reason for the rough running or seizing of the roller is friction at the roller journal, which scores into the bearing shell as the diameter is reduced. Solid particles and surface damage in the contact region accelerate this process.

U.S. Pat. No. 5,571,328 and EP 0 524 851 A1 disclose plain bearings that use ceramic plates in a wedge-shaped arrangement as the outer bearing shell. This is intended to prevent the roller journal from scoring into the bearing shell. Wear-related surface damage and particle deposits on the bearing journal nevertheless subject the ceramic plates to impacts, and can cause premature bearing failure.

DE Patent 43 07 282 A1 discloses a further roller arrangement in which the buoyancy of an air-filled roller in the metal bath is used to reduce load. Rolling bearings whose rolling elements rotate in the liquid metal are provided to support the roller. A disadvantage of this embodiment, however, is the fact that as a result of wear and dissolution effects in the metal bath, internal bearing clearance increases and dimensional accuracy is lost.

The publication "Antriebstechnik" 34 (1995) No. 7 furthermore describes a rolling bearing for use in a molten zinc bath which is embodied as a solid ceramic bearing. A disadvantage of this embodiment, however, is the fact that during service in molten metal, solid particles can penetrate into the raceways, and subject the ceramic bearing to impacts as they are rolled over. In addition, the ceramic can suffer damage due to impacts or thermal shock while being installed or removed.

To solve this problem, DE Unexamined Patent Application 39 40 890 A1 proposes to place the bearings in closed bearing housings that are sealed with respect to the molten bath. Sealing is accomplished by way of a conical sleeve that is retained displaceably on a shaft and is pressed by a spring element against a conical trough secured to the bearing housing. During operation, friction associated with abrasion occurs between the rotating roller and the stationary portion of the conical seal, so that the arrangement can become leaky after extended operation.

It is therefore the object of the invention to develop a roller arrangement of the kind cited initially in such a way that even in extended operation, complete sealing of the bearing housing with respect to the metal bath can be guaranteed.

According to the present invention, this object is achieved substantially in that, in order to seal the bearing housing with respect to the roller, sealing surfaces extending transversely to the roller axis are configured on a radially projecting shoulder of the roller and on the bearing housing, and are pressed against one another or against an interposed seal element. The result of this configuration is that molten metal from the metal bath must pass between the sealing surfaces of the roller shoulder and bearing housing in order to get into the interior of the bearing housing. The gap formed between the sealing surfaces can be very well sealed by axially acting contact pressure, however, so that any penetration of molten metal into the bearing housing can be reliably prevented even during extended operation.

According to an embodiment of the invention, provision is made for the radial shoulder to be provided on the end portion of the roller engaging into the bearing housing, i.e. sealing occurs on the inner side of the bearing housing. In this case a gas conduit preferably opens into the bearing housing in order to deliver gas to the bearing housing and generate a positive pressure, and by way of the positive pressure to push the radial roller shoulder toward the sealing surface of the bearing housing. With this configuration, generation of the contact force in the region of the sealing surfaces is achieved by the fact that the internal pressure acting in all directions attempts to push the roller journal out of the bearing housing against the hydrostatic pressure of the metal bath. This force can be calculated as the product of the difference between the internal pressure and the hydrostatic pressure times the cross-sectional area of the roller journal in the passthrough region. This pneumatic contact force has the advantage of not requiring any additional installation space, and guarantees that the sealing surfaces touch one another and that the roller journal remains axially in position. Wear in the region of the sealing surfaces results in axial shifting of the roller journal. The running surfaces of the bearing must correspondingly allow axial displacement of the roller journal.

If the internal pressure is greater than the hydrostatic pressure in the molten metal, it constitutes an additional safety feature. The reason is that if leaks occur in the region of the sealing surfaces, for example as a result of wear, the result of the internal pressure is that molten metal does not enter, but rather gas emerges, at a volume flow that is kept low by the fact that the annular gap between roller and bearing housing is narrow.

According to a development, provision is made for there to be arranged, between the sealing surfaces of the roller shoulder and bearing housing, an annular disk made of seal material that is pressed via the roller shoulder against the sealing surfaces on the bearing housing. This embodiment has the advantage that the annular disk can be configured as a wear-and-tear part, and can easily be replaced as necessary. The annular disk can be joined to the roller so that it co-rotates with the roller. In this case wear occurs only between the annular disk and the bearing housing. Alternatively, it is possible to join the annular disk to the bearing housing, so that the annular disk is stationary and wear thus occurs only between the annular disk and roller shoulder. According to a preferred embodiment, however, the annular disk is coupled, for example by way of driver pins, to the cage of a rolling bearing, the result being that it co-rotates during operation and a uniform load thus occurs on the two sealing surfaces.

The annular disk is preferably made of ceramic, which has the advantage that it is inert with respect to the molten metal. The friction between the very low-roughness ceramic surface and the seal participant is largely wear-free. The scuffing that is possible in the case of contact between two metal surfaces can thus be eliminated.

In an alternative embodiment of the invention, provision is made for the sealing surfaces of the roller shoulder and bearing housing to be provided on both sides of the annular gap formed between the bearing housing and roller, and for a seal element to be provided that is simultaneously pressed against both sealing surfaces and seals the annular gap, the seal element being coupled to the rolling bearing cage so that during operation, the seal element rotates both with respect to the roller journal and with respect to the bearing housing. With this embodiment, therefore, the sealing surfaces on the bearing housing and roller are not pressed against one another as in the embodiments described above, but rather the two sealing surfaces each seal the annular gap on one side (radially inward and radially outward) by their coaction with the seal element. The result of the coupling with the cage of the rolling bearing is that relative motions occur both between the seal element and the bearing housing and between the seal element and roller, so that uneven abrasion at the sealing surfaces can be largely avoided.

The compressive force necessary for contact pressure on the seal element can be generated, for example, by spring elements. It is furthermore possible to generate in the interior of the bearing housing a positive pressure that, with the further advantages already explained above, additionally presses the seal element against the sealing surfaces.

Thermally related axial expansions of the roller, and the increase in the distance between the two bearings associated therewith, can be compensated for, for example, by adapting the transverse span width. According to an embodiment of the invention, for this purpose one of the support arms is pivotably suspended on the crossmember, and furthermore the outer side of the bearing housing is of partially spherical configuration and is arranged in a receiving shell, of complementary configuration, of the support arm. The ball-and-socket type of fit then compensates for the pivoting motion of the support arm, and ensures that the two bearings are always aligned with the roller. Thermal distortions of the support arms are also compensated for in this fashion.

The seating surface of the receiving shell for the partially spherical bearing housing is of conforming configuration with respect thereto. By way of the conforming fit, the operating force is directed from the bearing housing onto the receiving shell and into the support arm. The fit is configured in such a way that the operating force from the bearing housing is received in planar fashion, within a solid angle range, by the receiving shell, and the bearing housing is secured without distortion in its seat. The receiving shell is advantageously subdivided into several, for example three, segments. Rotation of the bearing housing in the receiving shell is prevented, so as not to damage the pressure input line to the chamber.

According to a further embodiment, provision is made for the bearing housing to be arranged in axially displaceable fashion in a receiving shell. This makes it possible to compensate for different degrees of thermal expansion. A pivotable support arm such as is provided in the case of the embodiment described above can, but need not, be present.

The bearing housing should possess a certain freedom of movement within the receiving shell, so that it is immobilized in the seating surface only by the operating force. This positioning should not occur until the thermal equalization processes in the roller and in the support arms have stabilized. This ensures that during operation, the orientation of the bearings with respect to the roller stays in alignment.

According to a further embodiment of the invention, the contact force of the contacting seal can be additionally increased by the fact that the pivotably suspended support arm is pressed outward with an external force, as a result of which the sealing surfaces of the bearing housing are pressed against the sealing surfaces of the roller shoulder. This external force is independent of the internal pressure, and may be necessary in the event of a brief drop in internal pressure.

Regarding further possible configurations of the invention, reference is made to the dependent claims and to the description below of embodiments of the invention referring to the appended drawings, in which:

Figure 1:
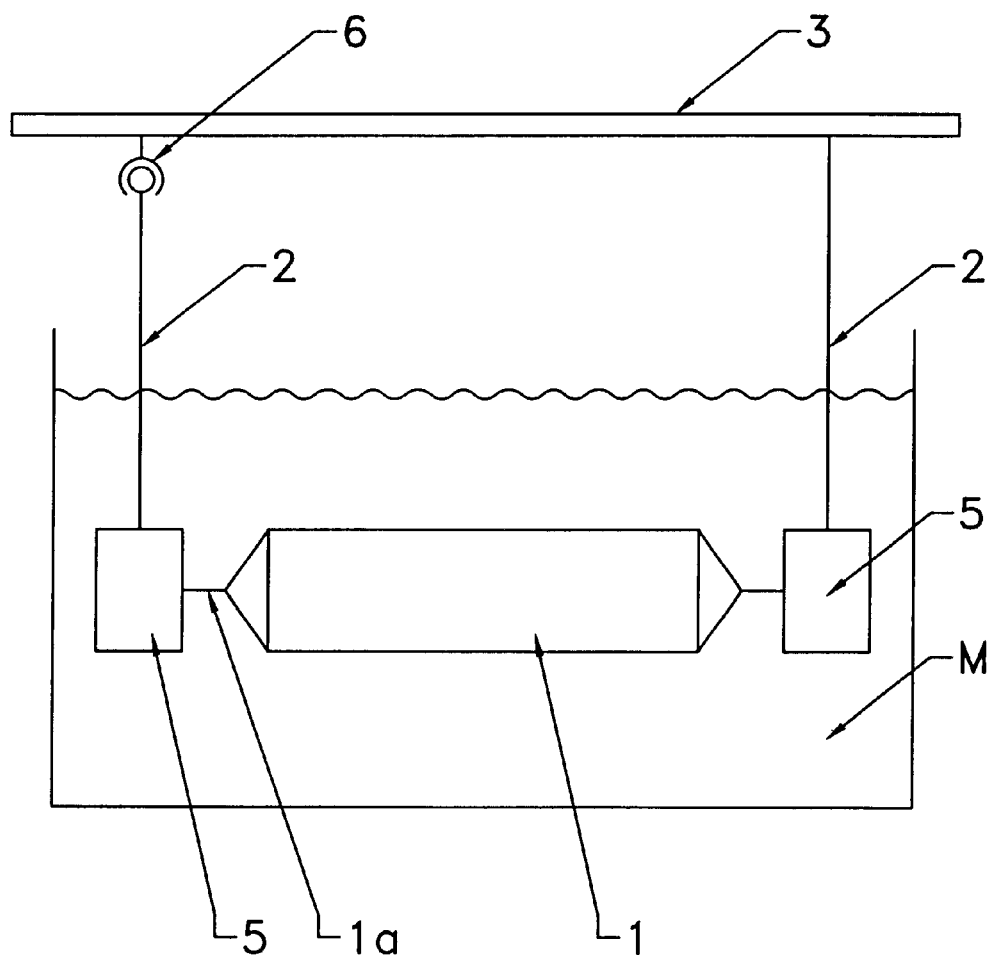
FIG. 1 shows, in a schematic view, a roller arrangement according to the present invention immersed in a metal bath.

FIG. 1 shows, in a schematic view, a roller arrangement according to the present invention as used in the continuous coating of strips. The roller arrangement comprises a roller 1, rotating in a metal bath M, that is supported at its ends rotatably on support arms 2 that project down from a crossmember 3 arranged above metal bath M. One of the two support arms 2 is arranged pivotably with an articulated joint 6 in such a way that any thermal expansion of roller 1 can be compensated for.

Figure 2:
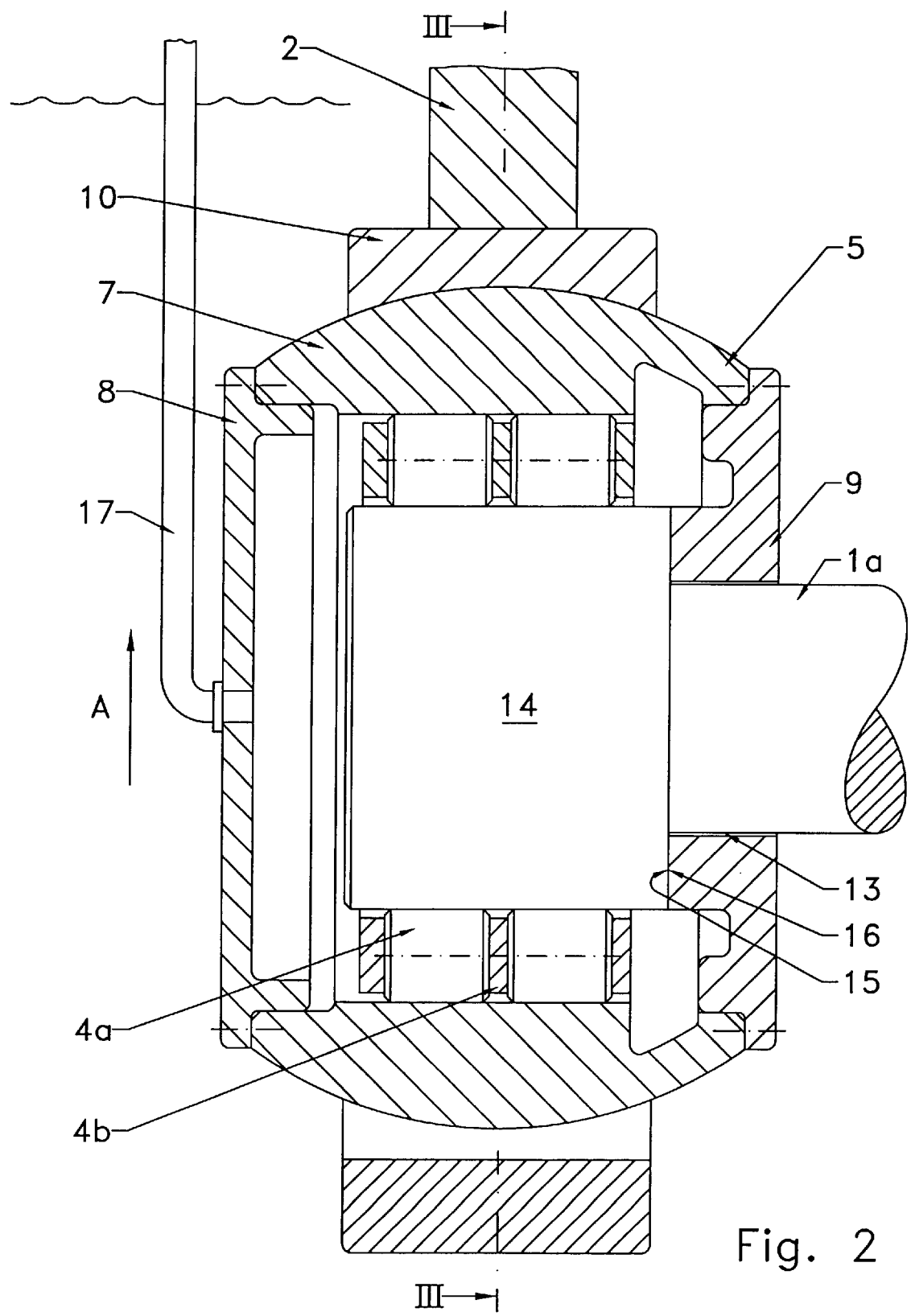
FIG. 2 shows a first embodiment of a bearing according to the present invention of the roller arrangement shown in FIG. 1.
Figure 3:
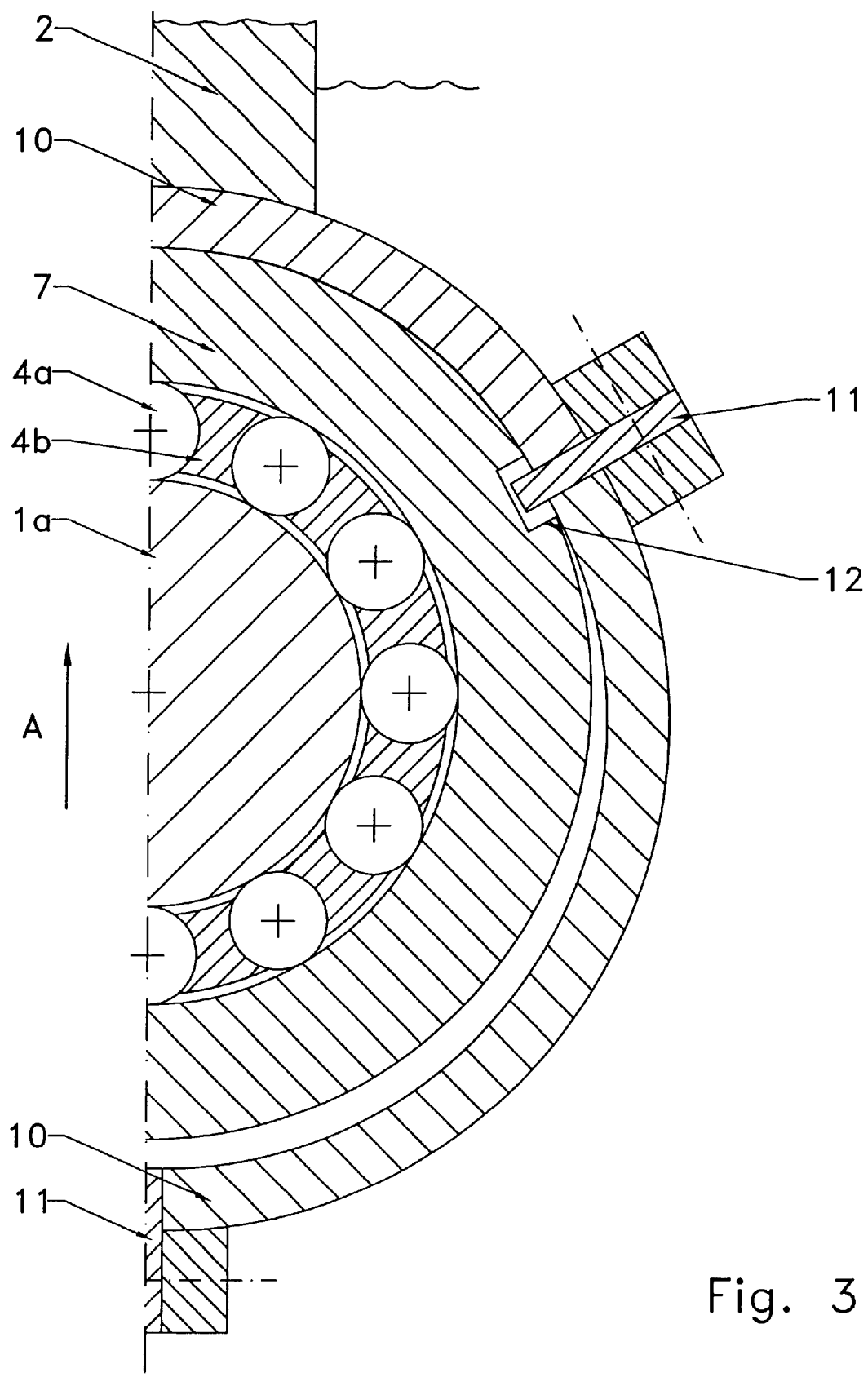
FIG. 3 shows the bearing in semi-section, along line III-III in FIG. 2.

Roller 1 is bearing-mounted in support arms 2 by way of rolling bearings 4 that are each arranged in a bearing housing 5 that is sealed with respect to metal bath M. As depicted in FIGS. 2 and 3, bearing housing 5 comprises an annular housing body 7 whose open end faces are respectively closed off by covers 8, 9. Housing body 7 is configured on its outer periphery in the form of a spherical segment, and is retained conformingly in a receiving shell 10 joined immovably to support arm 2. The conforming fit is embodied in such a way that an operating force A from bearing housing 5 can be received in planar fashion, within a solid angle range, by receiving shell 10, and that bearing housing 5 is secured in distortion-free fashion in receiving shell 10. Receiving shell 10 comprises a total of three segments, of which only two segments 10a, 10b are depicted in FIG. 3. Rotation of bearing housing 5 in receiving shell 10 is prevented by a plurality of retaining elements 11 which pass through receiving shell 10 and engage into recesses 12 on the outer side of housing body 7.

Figure 2A:
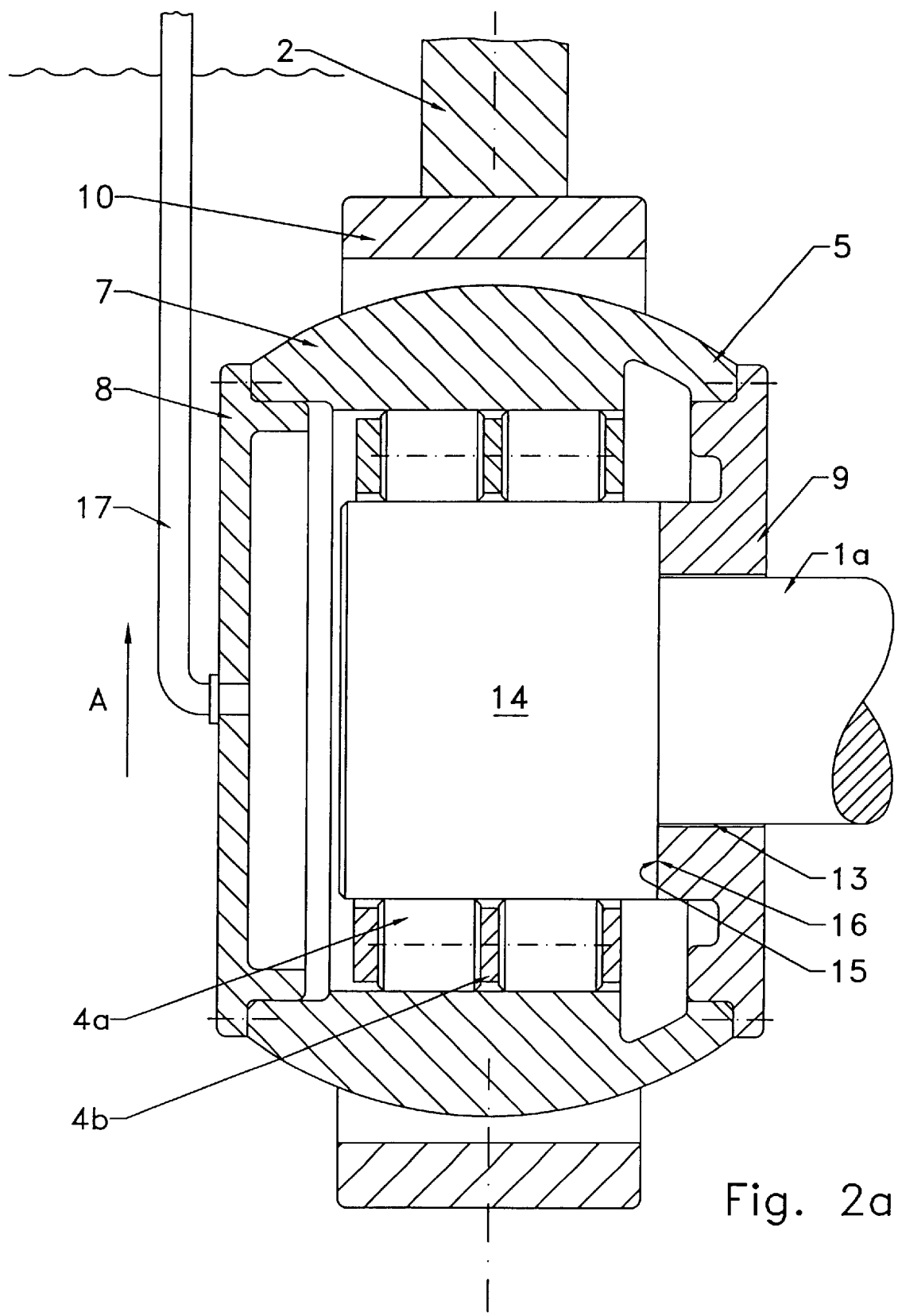
FIG. 2a shows a variant of the embodiment according to FIG. 2.

Alternatively, the bearing housing can also be retained in axially displaceable fashion in receiving shell 10 in order to compensate for thermal expansion. In this case support arm 2 does not need to be of pivotable design (FIG. 2*a*).

The inner surface of housing body 7, and the outer surface of a roller journal 1*a* engaging into bearing housing 5 through cover 9, are each configured as running surfaces, between which extend rolling elements 4*a* guided by a cage 4*b*.

Roller journal 1*a* is configured, in the region of its passage through cover 9, in such a way that a uniform peripheral annular gap 13 is created. To seal this annular gap 13, there is configured on roller journal 1*a* a radially outwardly protruding shoulder 14 on whose inwardly facing end face is configured a sealing surface 15 that is held under pressure against a corresponding sealing surface 16 on cover 9. The contact pressure can be generated by the fact that cover 9 is of appropriate configuration and is bolted onto housing body 7. In the embodiment depicted, the interior of bearing housing 5 can additionally be impinged upon by an internal pressure. For that purpose, a gas conduit 17 opens into bearing housing 5 in order to deliver gas to bearing housing 5 and generate a positive pressure, and by way of the positive pressure to press the radial roller shoulder 14 toward sealing surface 16 of bearing housing 5. The reason is that the internal pressure acting in all directions attempts to push roller journal 1a out of bearing housing 5 against the hydrostatic pressure of metal bath M. This force can be calculated as the product of the difference between the internal pressure and hydrostatic pressure times the cross-sectional area of roller journal 1a in the passthrough region. If this internal pressure is greater than the hydrostatic pressure in the molten metal, it additionally creates a safety feature counteracting the entry of molten metal if leaks should occur in the region of sealing surfaces 15, 16. In such a case, molten metal would not enter but rather gas would emerge, at a volume flow that can be kept low by the fact that annular gap 13 between roller 1 and bearing housing 5 is narrow. Annular gap 13 can additionally be sealed with a sealant, for example a high-temperature grease.

Figure 4:
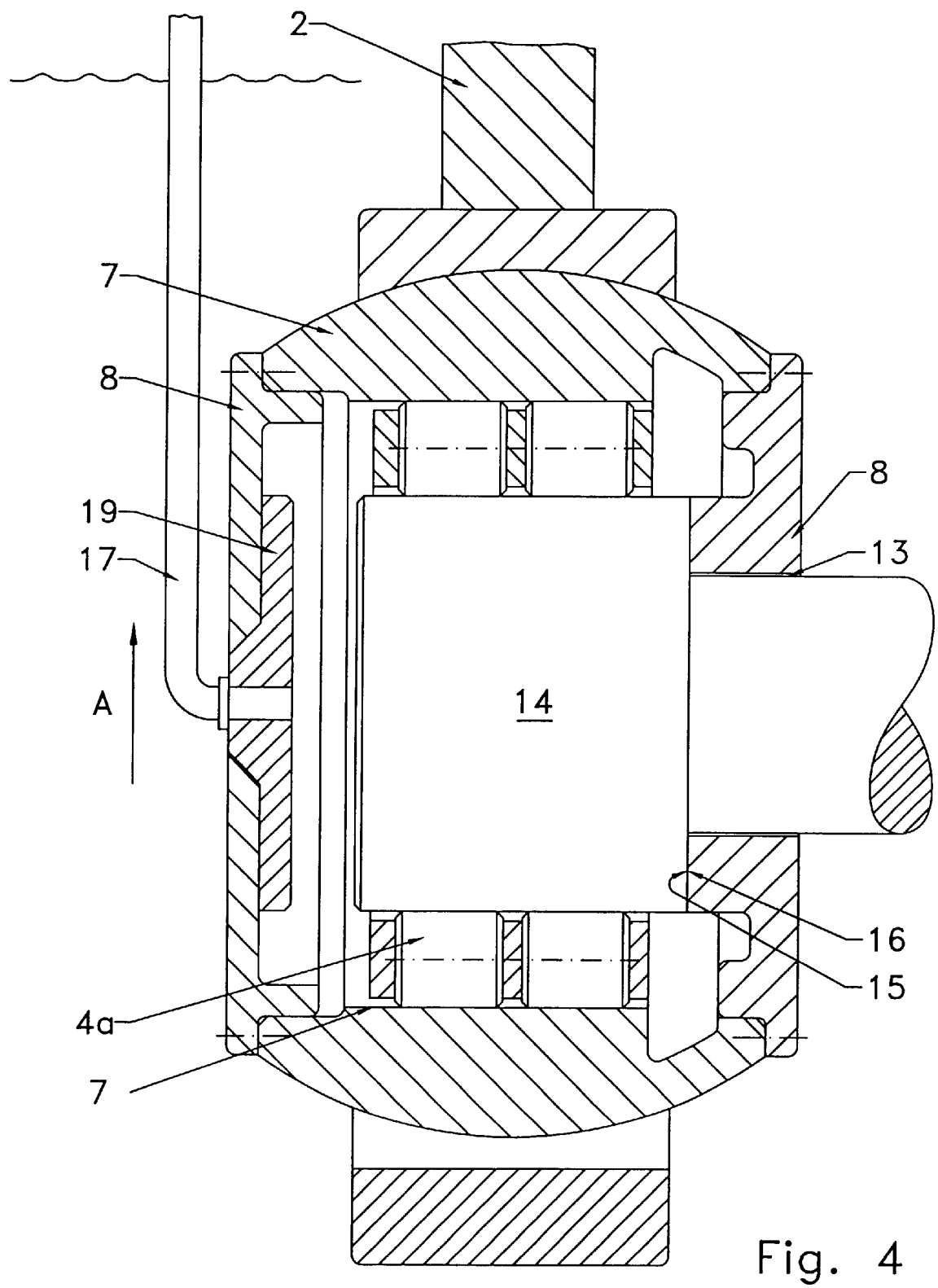
FIG. 4 shows, in section, a second embodiment of a bearing according to the present invention for the roller arrangement of FIG. 1.

As depicted in FIG. 4, gas conduit 17 can be mounted on a rotary union 19. Housing body 7 then no longer needs to be prevented from rotating, and any wear on housing body 7 is distributed uniformly over the entire outer ring running surface for rolling elements 4*a*.

Figure 5:
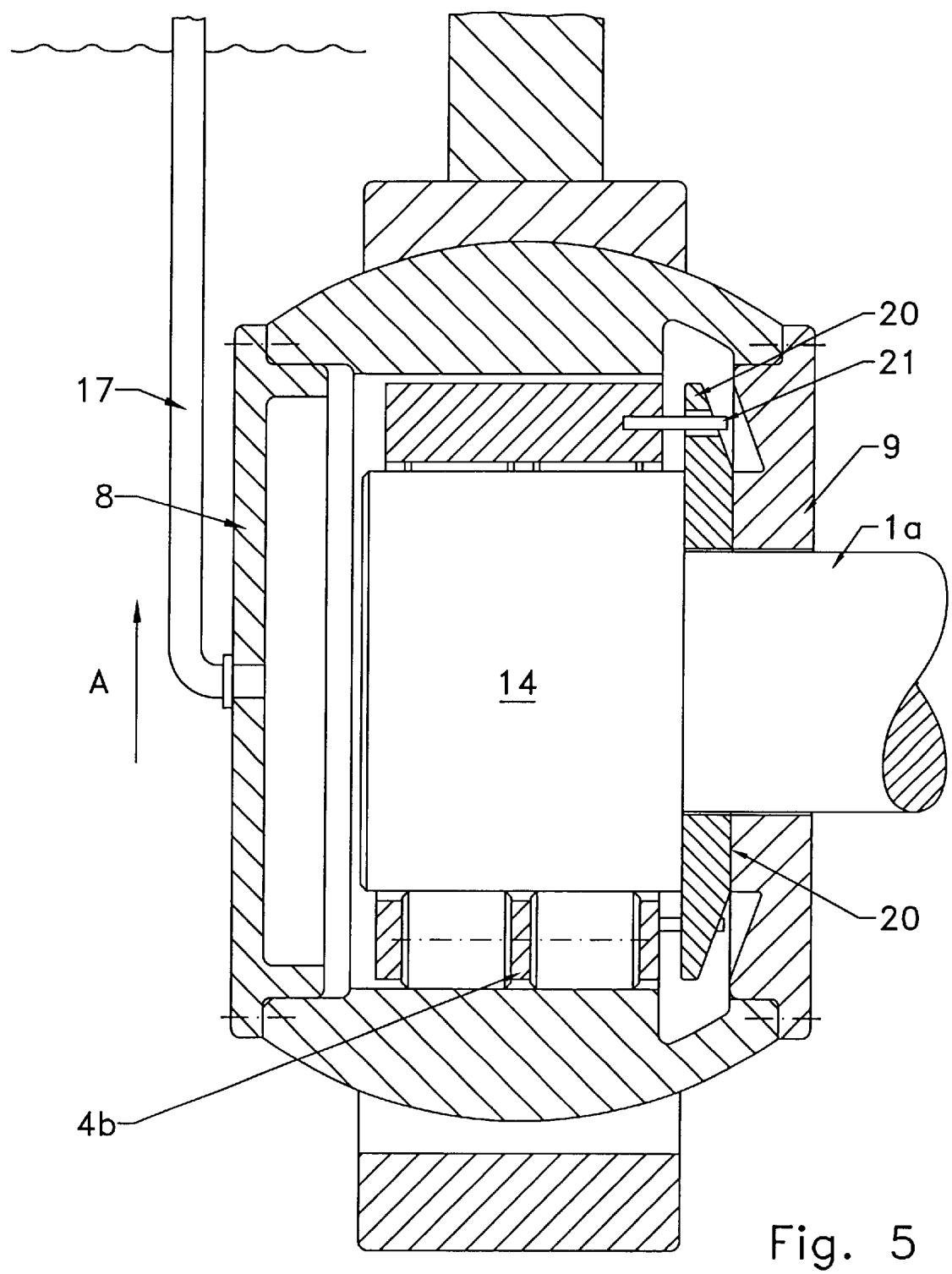
FIG. 5 shows, in section, a third embodiment of a bearing according to the present invention for the roller of the roller arrangement of FIG. 1.
Figure 6:
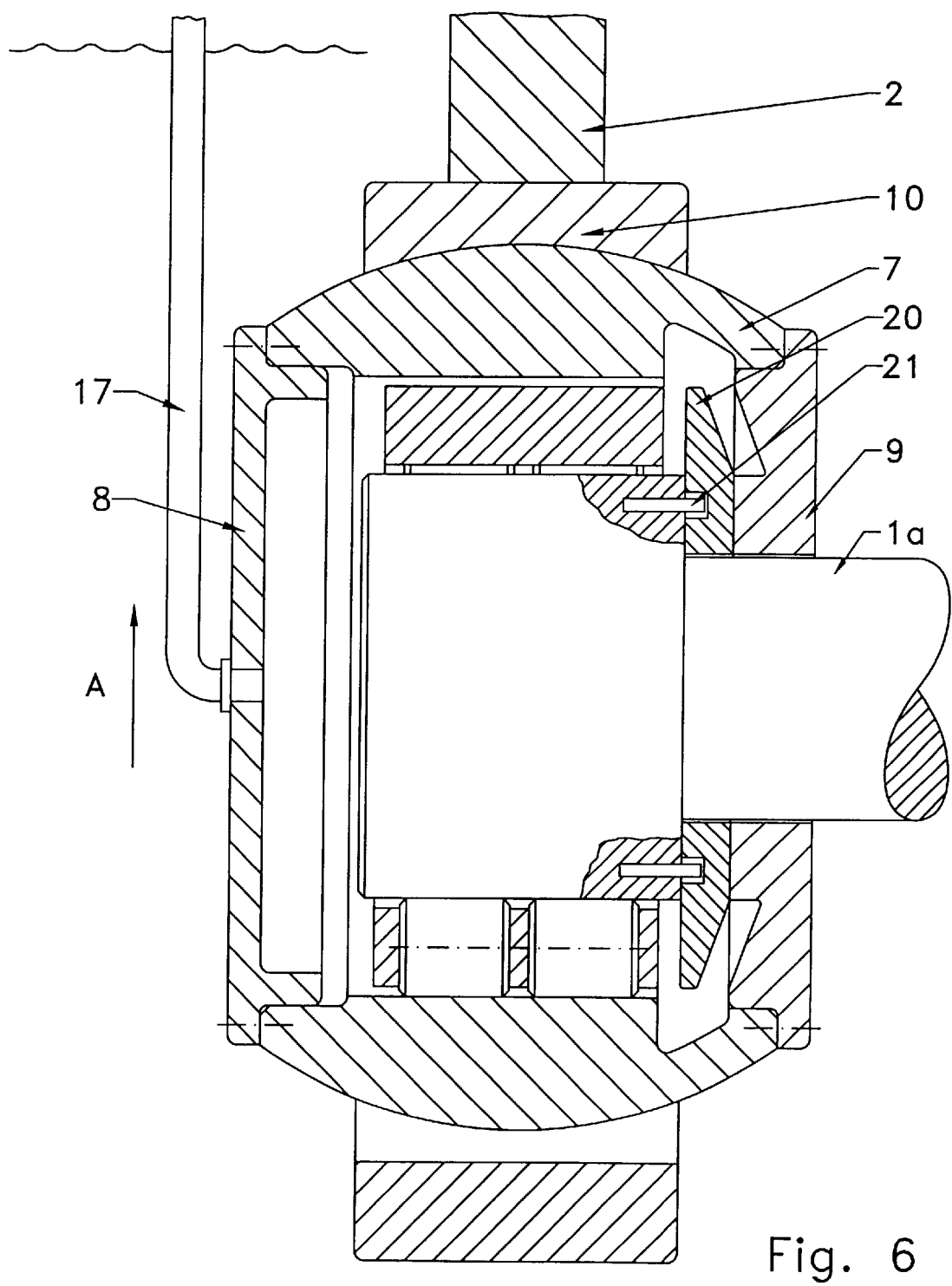
FIG. 6 shows, in section, a fourth embodiment of a bearing according to the present invention for the roller of the roller arrangement according to FIG. 1.

Sealing surfaces 15, 16 on roller shoulder 14 and cover 9 do not need to be directly in contact with one another; instead, a seal element 20 can also be interposed, as depicted in FIGS. 5 and 6. Seal element 20, which is configured as an annular disk, is preferably made of ceramic, which has the advantage that it is inert with respect to the molten metal. In addition, the friction between the very low-roughness ceramic surface and the sealing participant is large wear-free. The scuffing that is possible when two metal surfaces are in contact can thus be eliminated.

In the embodiment depicted in FIG. 5, seal element 20 is coupled to rolling bearing cage 4*b* by way of driver pins 21. Alternatively, however, it is also possible to join seal element 20 nonrotatably to roller 1, as shown in FIG. 6. In this case a relative motion, and thus wear, take place only between seal element 20 and cover 9.

Figure 7:
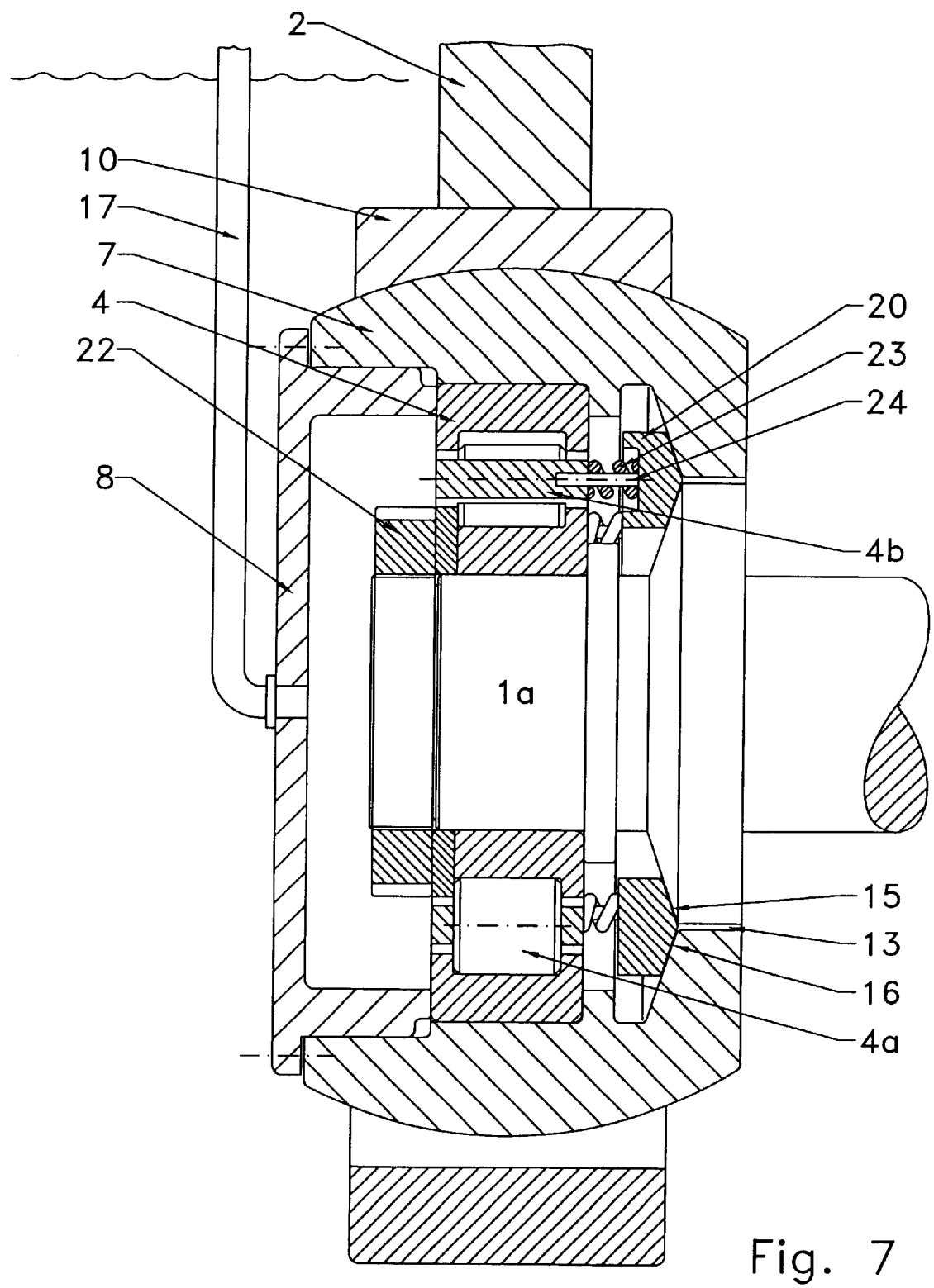
FIG. 7 shows, in section, a fifth embodiment of a bearing according to the present invention for the roller arrangement of FIG. 1.

FIG. 7 depicts a further embodiment of a bearing according to the present invention of the roller arrangement depicted in FIG. 1. Here bearing housing 5 possesses an annular housing body 7 with a spherical enveloping surface that is retained conformingly in a correspondingly config-ured receiving shell 10. Roller journal 1*a* engages into housing body 7 from the one end face, and the other end face is closed off by a cover 8. For axial immobilization of roller journal 1*a*, rolling bearing 4 is configured as a locating bearing. For that purpose, the outer ring of locating bearing 4 is clamped along with cover 8 in housing body 7. The inner ring of rolling bearing 4 is secured on roller journal 1*a* with a shaft nut 22. Rolling elements 4*a* of rolling bearing 4 are fitted into the bearing rings so as to result in a minimal axial clearance.

An annular gap 13 exists between housing body 7 and roller journal 1*a* in the region of the bearing journal passthrough; to seal that gap, a seal element 20 is provided which rests under pressure on the radial outer side of annular gap 13 against a corresponding sealing surface 16 on housing body 7, and on the radial inner side of annular gap 13 against a corresponding sealing surface 15 on a roller shoulder 14. Sealing surfaces 15, 16 extend transversely to roller axis X and substantially symmetrically with respect to annular gap 13; sealing surface 16 on housing body 7 has in the direction of annular gap 13 a circumferential flank with a decreasing diameter, and sealing surface 16 on roller shoulder 14 has an increasing diameter in the direction of annular gap 13. Sealing surfaces 15, 16 define the shape of the corresponding sealing surfaces of seal element 20. As wear occurs, the geometries of the sealing surfaces that come into mutual contact adapt to one another.

The annular seal element 20 is pressed by springs 23 axially against sealing surfaces 15, 16 of roller shoulder 14 and housing body 7, spring elements 23 each being guided by driver pins 24 with which seal element 20 is coupled to rolling bearing cage 4*b*.

By way of a gas conduit 17, the interior of bearing housing 5 can be impinged upon by a positive pressure, so that in the event of leakage of the contact seal, molten metal cannot penetrate into bearing housing 5.

What is claimed is:

1. A roller arrangement for a product to be coated in a molten metal bath, comprising a roller (1) which rotates in the metal bath and is retained at the ends rotatably on support arms (2) by way of rolling bearings (4), the rolling bearings (4) each being arranged in a bearing housing (5) sealed with respect to the metal bath (M), characterized in that in order to seal the bearing housing (5) with respect to the roller (1), sealing surfaces (15, 16) extending transversely to the roller axis (X) are configured on a radially projecting shoulder (14) of the roller (1) and on an inner surface of the bearing housing (5), and are retained under pressure against one another or against an interposed seal element (20).

2. The roller arrangement as defined in claim 1, characterized in that the radial shoulder (14) is provided on a journal (1*a*) of the roller (1) engaging into the bearing housing (5).

3. The roller arrangement as defined in claim 1, characterized in that the sealing surfaces (15, 16) extend perpendicular to the roller axis (X).

4. The roller arrangement as defined in claim 1, characterized in that a gas conduit (17) opens into the bearing housing (5) in order to deliver gas to the bearing housing (5) and generate a positive pressure, and by way of the positive pressure to push the roller shoulder (14) toward the sealing surface (16) of the bearing housing (5).

5. The roller arrangement as defined in claim 4, characterized in that the gas conduit (17) is guided in the bearing housing (5) rotatably about the roller axis (X).

6. The roller arrangement as defined in claim 4, characterized in that there is arranged, between the sealing surfaces (15, 16) of the roller shoulder (14) and bearing housing (5), a seal element (20) that is pressed via the roller shoulder (14) against the sealing surface (16) on the bearing housing (5).

7. The roller arrangement as defined in claim 6, characterized in that the seal element (20) is joined to bearing cage (4b) of a rolling bearing (4), to the roller (1), or to the bearing housing (5).

8. The roller arrangement as defined in claim 4, characterized in that there is arranged, between the sealing surfaces (15, 16) of the roller shoulder (14) and bearing housing (5), a seal element (20), comprising an annular disk made of ceramic, that is pressed via the roller shoulder (14) against the sealing surface (16) on the bearing housing (5).

9. The roller arrangement as defined in claim 1, characterized in that the sealing surfaces (15, 16) of the roller shoulder (14) and bearing housing (5) are provided on opposite sides of the annular gap (13) formed between the bearing housing (5) and roller (1), and a seal element (20) is provided that is simultaneously pressed against both sealing surfaces (15, 16) and seals the annular gap (13), the seal element (20) being coupled to the rolling bearing cage (4b) so that during operation, the seal element (20) rotates both with respect to the roller journal (1a) and with respect to the bearing housing (5).

10. The roller arrangement as defined in claim 9, characterized in that the seal element (20) is pressed against the sealing surfaces (15; 16) by the preload force of at least one elastic element (23).

11. The roller arrangement as defined in claim 9, characterized in that the seal element (20) is made of a ceramic material.

12. The roller arrangement as defined in claim 9, characterized in that a positive pressure, which presses the seal element (20) against the sealing surfaces (15, 16), can be generated in the bearing housing (5).

13. The roller arrangement as defined in claim 1, characterized in that one of the support arms (2) is pivotably retained.

14. The roller arrangement as defined in claim 13, characterized in that the bearing housing outer side is of partially spherical configuration and is arranged in a receiving shell (10) of suitable configuration.

15. The roller arrangement as defined in claim 1, characterized in that the bearing housing (5) is arranged in axially displaceable fashion in a receiving shell (10).

16. The roller arrangement as defined in claim 1, characterized in that the annular gap (13) between the roller journal (1a) and bearing housing (5) is sealed with a sealant.

17. The roller arrangement as defined in claim 1, characterized in that the annular gap (13) between the roller journal (1a) and bearing housing (5) is sealed with a high-temperature grease.

18. A roller arrangement for use in a molten metal bath, comprising:

first and second support arms;

first and second sealed bearing housings connected to each of said first and second support arms; and a roller having first and second ends rotatably supported on rolling bearings in said first and second sealed bearing housings, said roller being immersible in a molten metal bath, and said roller first end including a radially projecting shoulder extending transversely to an axis of the roller;

wherein said shoulder engages said bearing housing to substantially prevent the molten metal from entering said bearing housing.

19. The roller arrangement of 18 including means for biasing said shoulder against said bearing housing.

20. The roller arrangement of claim 18 wherein a source of positive pressure is connected to said bearing housing for biasing said shoulder against said bearing housing.

21. A roller arrangement for use in a molten metal bath, comprising:

first and second support arms;

first and second sealed bearing housings operably connected to each of said first and second support arms;

a roller having first and second ends rotatably supported by rolling bearings in said first and second sealed bearing housings, said roller being immersible in a molten metal bath, and said roller first end including a radially projecting shoulder extending transverse to an axis of the roller; and a seal element mounted between said shoulder and said bearing housing;

wherein said seal element engages said shoulder and said bearing housing to substantially prevent the molten metal from entering said bearing housing.

22. The roller arrangement of claim 21 including a spring biasing said seal element against said bearing housing.

23. The roller arrangement of claim 21, wherein a source of positive pressure is connected to said bearing housing for biasing said shoulder against said seal element.

\* \* \* \* \*